(12) United States Patent
Nangou et al.

(10) Patent No.: US 9,605,128 B2
(45) Date of Patent: Mar. 28, 2017

(54) GAS BARRIER MATERIAL AND GAS BARRIER LAMINATE

(71) Applicant: TOYO SEIKAN GROUP HOLDINGS, LTD., Tokyo (JP)

(72) Inventors: Shunya Nangou, Kanagawa (JP); Yusuke Obu, Kanagawa (JP); Kashiko Kawai, Kanagawa (JP); Tomohiro Miyai, Kanagawa (JP); Nan Zhang, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 209 days.

(21) Appl. No.: 14/387,701

(22) PCT Filed: Mar. 14, 2013

(86) PCT No.: PCT/JP2013/057294
§ 371 (c)(1),
(2) Date: Sep. 24, 2014

(87) PCT Pub. No.: WO2013/146323
PCT Pub. Date: Oct. 3, 2013

(65) Prior Publication Data
US 2015/0079405 A1    Mar. 19, 2015

(30) Foreign Application Priority Data
Mar. 30, 2012  (JP) .................. 2012-082180

(51) Int. Cl.
| C08K 3/08 | (2006.01) |
| C08K 3/10 | (2006.01) |
| C09D 133/02 | (2006.01) |
| C08J 7/04 | (2006.01) |
| C08L 33/02 | (2006.01) |

(52) U.S. Cl.
CPC ............... *C08K 3/08* (2013.01); *C08J 7/042* (2013.01); *C08J 7/047* (2013.01); *C08K 3/10* (2013.01); *C09D 133/02* (2013.01); *C08J 2367/02* (2013.01); *C08J 2475/06* (2013.01); *C08K 2201/008* (2013.01); *C08L 33/02* (2013.01); *C08L 2312/00* (2013.01); *Y10T 428/31547* (2015.04)

(58) Field of Classification Search
CPC ...... C08K 3/08; C08K 3/10; C08K 2201/008; C08J 7/042; C08J 7/047; C08J 2367/02; C08J 2475/06; C09D 133/02; Y10T 428/31547; C08L 33/02; C08L 2312/00
See application file for complete search history.

(56) References Cited

U.S. PATENT DOCUMENTS

| 6,605,344 | B1 | 8/2003 | Ohba et al. |
| 8,211,519 | B2 | 7/2012 | Obu et al. |
| 8,722,193 | B2 | 5/2014 | Miyai et al. |
| 2005/0131162 | A1* | 6/2005 | Tanaka ............... B32B 27/06 525/329.7 |
| 2007/0111005 | A1 | 5/2007 | Oshita et al. |
| 2011/0091743 | A1 | 4/2011 | Obu et al. |
| 2011/0200836 | A1* | 8/2011 | Obu .................... B32B 27/32 428/500 |
| 2011/0210034 | A1 | 9/2011 | Shibata et al. |
| 2012/0238696 | A1 | 9/2012 | Obu et al. |
| 2013/0273374 | A1 | 10/2013 | Kawai et al. |

FOREIGN PATENT DOCUMENTS

| CN | 1890093 | 1/2007 |
| JP | 2000-931 | 1/2000 |
| JP | 2001-19782 | 1/2001 |
| JP | 2002-240207 | 8/2002 |
| JP | 2002-302150 | 10/2002 |
| JP | 2003-292713 | 10/2003 |
| JP | 2004-249614 | 9/2004 |
| JP | 2007-313758 | 12/2007 |
| WO | 2009/041500 | 4/2009 |
| WO | 2009/128270 | 10/2009 |
| WO | 2010/053097 | 5/2010 |
| WO | 2011/078366 | 6/2011 |

OTHER PUBLICATIONS

Search report from International Bureau of WIPOin PCT/JP2013/057294, mail date is Jun. 18, 2013.
Office Action issued in Chinese Counterpart Patent Appl. No. 201380016826.0, dated Sep. 17, 2015 , along with an english translation thereof.

* cited by examiner

*Primary Examiner* — Robert Jones, Jr.
(74) *Attorney, Agent, or Firm* — Greenblum & Bernstein, P.L.C.

(57) ABSTRACT

A gas barrier material comprising a polycarboxylic acid polymer, and containing 0.10 to 1.4% by weight of a monovalent metal element, at least not less than 5.0% by weight of a polyvalent metal element, and 0.01 to 3.0% by weight of a nitrogen element per the total weight of nitrogen and carbon. The gas barrier material exhibits excellent gas barrier property, excellent waterproof property after the bend working and excellent appearance on the surface of the coating.

9 Claims, 1 Drawing Sheet

GAS BARRIER MATERIAL AND GAS BARRIER LAMINATE

TECHNICAL FIELD

This invention relates to a gas barrier material comprising a polycarboxylic acid polymer and to a gas barrier laminate having a gas barrier layer formed of the gas barrier material. More specifically, the invention relates to a gas barrier material having excellent gas barrier property, retort resistance, flexibility, producibility, as well as waterproof property, transparency and luster after the bend working, and to a gas barrier laminate.

BACKGROUND ART

A variety of kinds of gas barrier materials have heretofore been proposed. In recent years, in particular, there have been proposed gas barrier materials obtained by crosslinking a polycarboxylic acid polymer with polyvalent metal ions from the standpoint of environmental friendliness and not being affected by humidity conditions.

For example, there have been proposed a gas barrier film obtained by applying a layer that contains a metal compound onto the surface of a layer of a formed material comprising a mixture of polyalcohols and at least one poly(meth)acrylic acid polymer selected from the group consisting of a poly(meth)acrylic acid and a partly neutralized product of the poly(meth)acrylic acid (patent document 1), and a gas barrier film obtained by forming a gas barrier coating on at least one surface of a thermoplastic resin film, the coating being formed of a polyacrylic acid that is crosslinked with a crosslinking agent containing an epoxy compound having three or more epoxy groups per a molecule thereof, and the crosslinking agent being contained in an amount of 1 to 100 parts by mass per 100 parts by mass of the polyacrylic acid (patent document 2).

The gas barrier materials disclosed in the above patent documents 1 and 2 must be crosslinked to a high degree at a high temperature of not lower than 150° C. or by being heated for extended periods of time accompanied by such problems as seriously affecting the plastic base material, and requiring a dip treatment or a spray treatment at the time of ionic crosslinking with metal ions, lowering the productivity, and consuming large amounts of energy and water. Besides, the gas barrier materials are not still satisfactory in regard to flexibility and retort resistance.

As a gas barrier laminated film on which dry-printing can be effected at a relatively low temperature, further, there has been proposed a gas barrier laminated film comprising a layer (a) formed from a coating solution (A) containing a polycarboxylic acid polymer without heat treatment and a layer (b) formed from a coating solution (B) containing a water-soluble polyvalent metal salt and an aqueous resin, the layer (a) formed from the coating solution (A) and the layer (b) formed from the coating solution (B) forming at least a pair of lamination units abutting to each other (patent document 3).

The gas barrier laminated film disclosed in the above patent document 3 can be dry-printed at a relatively low temperature; i.e., the gas barrier laminated film is obtained without affecting the base material. With this laminated film, however, the polycarboxylic acid polymer that is applied first is fixed and does not sufficiently migrate into the layer (a) of the polyvalent metal layer. Therefore, the crosslinking with polyvalent metal ions is not attained to a sufficient degree, and the gas barrier property is not still satisfactory unless the ionic crosslinking ratio is enhanced by conducting a dip treatment or a spray treatment which is the conventional method as the treatment after the printing.

The present inventors have, further, proposed a gas barrier material having a barrier layer comprising a polycarboxylic acid polymer, the surface layer of the barrier layer forming a chemical bond stemming from an isocyanate group, and the content of nitrogen in the surface layer being at least 1 atom % or more per the total amount of carbon, oxygen and nitrogen (patent document 4).

PRIOR ART DOCUMENTS

Patent Documents

Patent document 1: JP-A-2000-931
Patent document 2: JP-A-2002-240207
Patent document 3: JP-A-2007-313758
Patent document 4: International Laid-Open No. WO 2009/041500

OUTLINE OF THE INVENTION

Problems that the Invention is to Solve

The above gas barrier materials are obtained by applying a barrier layer-forming coating material that contains a highly hydrogen-bonding polymer on an isocyanate compound-containing layer that has been formed in advance, evaporating the solvent in the coating material so that the isoyanate compounds migrates toward the surface of the barrier layer thereby to form, in the barrier layer, the surface layer forming chemical bonds stemming from the isocyanate groups exhibiting, therefore, such excellent properties as gas barrier property, retort resistance, producibility and, further, offering such excellent effects that the isocyanate compound-containing layer works as an anchor layer and, further, making it possible to form an anti-blocking layer as well.

However, the above gas barrier materials were not still fully satisfactory in regard to luster on the surfaces thereof, i.e., luster on the surface of coating and in regard to transparency, either. Therefore, it has been urged to provide a gas barrier material having further improved appearance.

It is, therefore, an object of the present invention to provide a gas barrier material having excellent gas barrier property, excellent appearance on the surface of the coating, and excellent waterproof property after the bend working.

Another object of the invention is to provide a gas barrier laminate having excellent gas barrier property, excellent appearance on the surface of the coating, and excellent waterproof property after the bend working, and can be produced maintaining good efficiency through a decreased number of steps.

Means for Solving the Problems

According to the present invention, there is provided a gas barrier material comprising a polycarboxylic acid polymer, and containing 0.10 to 1.4% by weight of a monovalent metal element, at least not less than 5.0% by weight of a polyvalent metal element, and 0.01 to 3.0% by weight of a nitrogen element per the total weight of nitrogen and carbon.

In the gas barrier material of the present invention, it is desired that:
1. The polycarboxylic acid polymer is a poly(meth)acrylic acid;

2. The monovalent metal element is sodium or potassium;
3. The polyvalent metal element is calcium or magnesium; and
4. The content of nitrogen per the total amount of carbon, oxygen and nitrogen in the surface layer is not less than 1 atom %.

According to the present invention, further, there is provided a gas barrier laminate having:

a gas barrier layer (B) that comprises the gas barrier material formed on at least one surface of a plastic base material; and a layer (A) that contains an isocyanate compound having at least two isocyanate groups in a molecule thereof, the layer (A) being formed between the plastic base material and the gas barrier layer (B).

In the gas barrier laminate of the present invention, it is desired that:
1. The layer (A) contains an alkaline compound of a polyvalent metal;
2. The alkaline compound of a polyvalent metal comprises at least one of a carbonate of calcium or magnesium, or a hydroxide thereof;
3. The isocyanate compound is a combination of a straight-chain aliphatic isocyanate compound and an alicyclic isocyanate compound having an alicyclic ring structure in the skeleton thereof;
4. The aliphatic isocyanate compound has an isocyanurate structure; and
5. A region (a) free of the alkaline compound of a polyvalent metal is formed in the layer (A) on the side of the gas barrier layer (B), and the content of nitrogen in the region (a) is larger than the content of nitrogen in the layer (A) other than the region (a).

Effects of the Invention

Referring to the gas barrier material and the gas barrier laminate of the invention, the gas barrier material comprising the polycarboxylic acid polymer exhibits excellent gas barrier property and flexibility, achieves excellent gas barrier property even when it is placed under high-temperature and high-humidity conditions such as of retort sterilization and, further, exhibits retort resistance.

Besides, the gas barrier material or the gas barrier layer contains the monovalent metal element in an amount in the above-mentioned range, and exhibits excellent transparency, excellent luster on the surface of the coating and, therefore, favorable appearance, further, contributing to improving waterproof property after the bend working, and effectively preventing interlayer peeling even when a gas barrier layer is formed on the base material or on the under-coating.

In the gas barrier material and the gas barrier laminate of the present invention, further, the gas barrier material or the gas barrier layer contains a nitrogen element in an amount of 0.01 to 3.0% by weight per the total weight of nitrogen and carbon in the gas barrier material or the gas barrier layer, and exhibits excellent waterproof property and anti-blocking property after the bend working without decreasing gas-barrier property.

Moreover, the gas barrier material or the gas barrier laminate of the invention has excellent gas barrier property and retort resistance even without being crosslinked by covalent bonding by using polycarboxylic acid polymer, and makes it possible to simplify the step of heat treatment necessary for the crosslinking reaction.

The gas harrier laminate of the invention has an under-coating that contains an isocyanate compound having at least two isocyanate groups in a molecule thereof, the under-coating being formed between the gas barrier layer of the gas barrier material and the plastic base material, enabling the isocyanate compound to be present near the interfaces of gas barrier layer/under-coating and undercoating/plastic base material, developing an interfacial reaction with such functional groups as carboxyl groups of the polycarboxylic acid polymer or hydroxyl groups contained in the plastic base material, or generating electric cohesive force among the polar groups in the interface, contributing to further improving close adhesion between the layers.

Further, the gas barrier laminate of the invention features improved ionic crosslinking with a polyvalent metal even without conducting the dip treatment or the spray treatment. Namely, the gas barrier laminate having excellent gas barrier property can be efficiently produced.

The gas barrier material and the gas barrier laminate of the present invention have a sufficient degree of gas barrier property, i.e., such excellent gas barrier property and retort resistance as permitting oxygen, before the retort treatment, to pass through in an amount of 0.3 $cm^3/m^2 \cdot day \cdot atm$ (in an environment of 25° C.-80% RH) (in compliance with the JIS K-7126) and, after the retort treatment, to pass through in an amount of 0.7 $cm^3/m^2 \cdot day \cdot atm$ (in an environment of 25° C.-80% RH). Further, when the flexibility was evaluated in terms of the amount of oxygen that has permeated through after the retort treatment and after having conducted the crushing treatment 200 times by using the Gelboflex tester according to a method described in Examples, the flexibility was as excellent as that the amount of oxygen that has permeated through was not more than 10 $cm^3/m^2 \cdot day \cdot atm$ (in an environment of 25° C.-80% RH). As a result, excellent interlayer adhesion was attained without developing interlayer peeling.

MODE FOR CARRYING OUT THE INVENTION

The gas barrier material of the present invention comprises a polycarboxylic acid polymer, and contains 0.10 to 1.4% by weight of a monovalent metal element, at least not less than 5.0% by weight of a polyvalent metal element, and 0.01 to 3.0% by weight of a nitrogen element per the total weight of nitrogen and carbon.

As described above, gas barrier materials have been widely known being obtained by ionically crosslinking the polycarboxylic acid polymer with polyvalent metals. A variety of gas barrier materials have been proposed by the present inventors, too. According to the present invention, it was discovered that among such gas barrier materials, there can be provided a gas barrier material having excellent appearance such as luster and transparency as well as waterproof property after the bend working yet possessing excellent gas barrier property, waterproof property and retort resistance by controlling the contents of a monovalent element, polyvalent element and nitrogen to lie within predetermined ranges.

That is, as will be obvious from the results of Examples appearing later, the gas barrier material and the gas barrier laminate of the present invention not only have retort resistance without impairing gas barrier property even when subjected to the retort treatment but also are effectively prevented from peeling off the base material or from developing interlayer peeling even when dipped in water for extended periods of time after the bend working, and, further, excel in transparency and luster on the surface of coating (Examples 1 to 16).

If the amount of the monovalent metal element is smaller than the above range, on the other hand, then even the gas barrier material or the gas barrier laminate obtained by ionically crosslinking the polycarboxylic acid polymer with a polyvalent metal lacks luster on the surface of coating (Comparative Example 3). If the amount of the monovalent metal element is larger than the above range, the waterproof property becomes poor after the bend working and the gas barrier property becomes poor, too, after the retort treatment (Comparative Example 4). If the content of the polyvalent metal element is smaller than the above value, further, the gas barrier property becomes poor and the waterproof property after the bending becomes poor, too (Comparative Example 2). It is obvious that if the content of nitrogen per the total weight of nitrogen and carbon is smaller than the above range, the waterproof property after the bend working becomes poor (Comparative Example 5) whereas if the content of nitrogen is larger than the above range, the gas barrier property becomes poor (Comparative Examples 1, 6).

The monovalent metal element and the polyvalent metal element in the gas barrier material of the present invention stem, respectively, from a monovalent metal-containing compound that is used for partly neutralizing the polycarboxylic acid polymer and from an alkaline compound of a polyvalent metal used for ionically crosslinking the carboxyl groups of the polycarboxylic acid polymer. Further, the nitrogen element stems from the isocyanate compound. With the contents of these elements lying in the above-mentioned ranges, the above-mentioned actions and effects are expressed. The contents of these metal elements can be measured by using an ICP mass analyzer after the gas barrier material has been incinerated. The nitrogen element in the gas barrier material can be measured by the combustion method. Further, the contents of carbon, oxygen and nitrogen atoms in the surface layer of the gas barrier material can be measured by surface analysis by using the XPS (X-ray Photo-Electronic Spectroscopy).

(Gas Barrier Material)

The gas barrier material of the present invention comprises a polycarboxylic acid polymer as a chief constituent component and in which the carboxyl group of the polycarboxylic acid polymer is ionically crosslinked with a polyvalent metal and, owing to the presence of the nitrogen element stemming from the isocyanate compound, exhibits excellent gas barrier property and waterproof property to withstand the retort sterilization and, further, exhibits waterproof property and anti-blocking property after the bend working. Here, it is important that the gas barrier material contains the monovalent metal element, polyvalent metal element and nitrogen component in amounts in the above-mentioned ranges.

The gas barrier material of the present invention having the above features can be formed by forming a sheet, film or coating from a composition for forming the gas barrier material that contains a polycarboxylic acid polymer, a basic compound having a monovalent metal element necessary for partly neutralizing the polymer, and an isocyanate compound, and ionically crosslinking the carboxyl groups therein with a polyvalent metal-containing compound.

In the gas barrier laminate comprising a combination of the gas barrier material of the invention and an undercoating as will be described later, a layer is formed by applying a solution that contains the polycarboxylic acid polymer on the undercoating that contains the isocyanate compound and a polyvalent metal-containing composition, enabling the polyvalent metal ions and the isocyanate compound to be efficiently fed from the undercoating into the polycarboxylic acid polymer, thus forming a gas barrier layer which is the same as the gas barrier material of the invention on the undercoating.

[Polycarboxylic Acid Polymer]

As the polycarboxylic acid polymer that constitutes the gas barrier material of the invention, it is important to use the one that is partly neutralized with the monovalent metal element from the standpoint of obtaining such action and effect as the above-mentioned waterproof property after the bend working and appearance on the surface of the coating. It is, specifically, desired to use the polycarboxylic acid polymer which is partly neutralized in a range of 0.4 to 4.5% and, particularly, 1.0 to 4.0% in terms of a mole ratio to the carboxyl groups, from the standpoint of controlling the amount of the monovalent metal element in the gas barrier material to lie in the above-mentioned range. If the amount of neutralization is larger than the above range, the waterproof property after the bend working and the gas barrier property after the retort treatment become poorer than those of if the amount of neutralization is in the above range. If the amount of neutralization is smaller than the above range, on the other hand, the appearance on the surface of the coating becomes poorer than that of if the amount of neutralization is in the above range.

As the monovalent metal, sodium and potassium are specifically desired. As a compound of the monovalent metal, it is desired to use a hydroxide thereof to neutralize the polycarboxylic acid polymer.

As the polycarboxylic acid polymer, there can be exemplified homopolymers or copolymers of monomers having a carboxyl group, such as polyacrylic acid, polymethacrylic acid, polymaleic acid, polyitaconic acid, and acrylic-methacrylic acid copolymer and, specifically, polyacrylic acid and polymethacrylic acid.

Though not specifically limited, it is desired that the polycarboxylic acid polymer has a "weight average molecular weight" in a range of 2,000 to 5,000,000 and, specifically, 10,000 to 1,000,000.

The "weight average molecular weight" is found from a chromatogram and a calibration curve of a standard polycarboxylic acid polymer by using two separation columns, i.e., "TSK G4000PWXL" and "TSK G3000PWXL" (manufactured by Toso Co.), by using an aqueous solution containing 50 mmols of phosphoric acid as an eluent at 40° C. and a flow rate of 1.0 ml/min.

[Isocyanate Compound]

The gas barrier material of the present invention is desirably blended with an isocyanate compound to have the nitrogen element present in the gas barrier material in an amount in the above-mentioned range.

The isocyanate compound can be used being suitably selected out of the isocyanate compounds exemplified as the isocyanate curing agents used for an undercoating that will be described later. Among the isocyanate compounds, however, it is desired to use the one that is poorly compatible with the polycarbxylic acid polymer, such as isophoronediisocyanate and derivatives thereof. This makes it possible to efficiently bleed out the isocyanate compound onto the surface of the gas barrier material, to have a chemical bond stemming from the isocyanate compound present on the surface of the gas barrier material and, therefore, to impart waterproof property and anti-blocking property to the gas barrier material after the bend working.

[Production of the Gas Barrier Material]

The gas barrier material of the present invention is produced by preparing a composition for forming the gas barrier material containing a polycarboxylic acid polymer, a basic compound having a monovalent metal element necessary for partly neutralizing the polymer, and an isocyanate compound, and forming a film, sheet or coating from the composition for forming the gas barrier material, and ionically crosslinking the carboxyl groups in the polycarboxlic acid polymer with a composition containing an alkaline compound of a polyvalent metal.

The composition for forming the gas barrier material can be prepared by dissolving the polycarboxylic acid polymer and the isocyanate compound in a solvent containing water, or can be prepared by mixing water-containing solutions of these components, and is a solution in which the polycarboxylic acid polymer is dissociated.

The solvent for dissolving the polycarboxylic acid polymer may be water alone, or a mixed solvent of water and an organic solvent such as alcohol like methanol, ethanol or isopropanol, ketone like 2-butanone or acetone, or an aromatic solvent like toluene, and is, specifically, a combination of water and an organic solvent having a boiling point lower than that of water.

From the standpoint of bleeding out the isocyanate compound, the organic solvent is used, desirably, in an amount of 10 to 400 parts by weight per 100 parts by weight of water.

An inorganic dispersing material may be used in addition to the above components. The inorganic dispersing material has a function for blocking water entering from the exterior and for protecting the gas barrier material, and works to further improve gas barrier property and waterproof property.

The inorganic dispersing material may have any shape such as spherical shape, needle-like shape or lamellar shape, exhibits wettability to the polycarboxylic acid polymer, and disperses well in the composition for forming the gas barrier material. From the standpoint of blocking water, in particular, there is preferably used a silicate compound having a lamellar crystalline structure, such as water-swelling mica, clay, etc. The inorganic dispersing material has an aspect ratio of, desirably, not less than 30 but not more than 5000 from the standpoint of being dispersed in the form of lamellas to block water.

The inorganic dispersing material is contained in an amount of, desirably, 5 to 100 parts by weight per 100 parts by weight of the total of the polycarboxylic acid polymer and the isocyanate compound.

In the gas barrier material of the present invention, it is desired that the amount of the polycarboxylic acid polymer, i.e., the amount of the free carboxyl groups contained in the resin composition for forming the gas barrier material, is not less than at least 150 KOHmg/g and, specifically, is in a range of 250 to 970 KOHmg/g in terms of an acid value. Here, the acid value is the amount of the potassium hydroxide in milligrams necessary for neutralizing the acidic free functional groups contained in a gram of the resin, and is found by an ordinary method based on the alkali neutralizing titration.

It is, further, desired that the isocyanate compound is contained in an amount of 0.04 to 12 parts by weight and, specifically, 0.1 to 7 parts by weight per 100 parts by weight of the polycarboxylic acid polymer.

Though dependent upon the kinds or contents of the polycarboxylic acid polymer and the isocyanate compound that are used or upon the amount of applying the composition for forming the gas barrier material, the composition for forming the gas barrier material is heated at a temperature of 40 to 110° C. for one second to one minute (peak-holding time) to form a sheet, a film or a coating thereof. Next, the carboxyl groups in the sheet, film or coating are ionically crosslinked with a polyvalent metal compound.

Though not limited thereto only, the ionically crosslinked structure with a polyvalent metal can be easily formed by treating the gas barrier material with water that contains an alkaline compound of a polyvalent metal or with an alcohol solution that contains the alkaline compound of the polyvalent metal.

The treatment with water that contains the alkaline compound of the polyvalent metal may be (i) a treatment of dipping the gas barrier material in water that contains the alkaline compound of the polyvalent metal, (ii) a treatment of spraying, onto the gas barrier material, water that contains the alkaline compound of the polyvalent metal, (iii) a treatment of placing the gas barrier material in an atmosphere of a high humidity after the treatment (i) or (ii), or (iv) a retort treatment with water that contains the alkaline compound of the polyvalent metal (preferably, a method of bringing a packing material into direct contact with hot water).

The above treatment (iii) brings about the aging effect after the treatment (i) or (ii), and makes it possible to shorten the time of the treatment (i) or (ii). In any of the treatments (i) to (iii), water used for the treatment may be cold water. In order for water that contains the alkaline compound of the polyvalent metal to easily act upon the gas barrier material, however, it is better that the temperature of water that contains the alkaline compound of the polyvalent metal is not lower than 20° C. and, specifically, 40 to 100° C. In the case of the treatment (i) or (ii), the treating time is desirably not less than 3 seconds and, specifically, about 10 seconds to about 4 days. In the case of the treatment (iii), the treatment (i) or (ii) is conducted for not less than 0.5 seconds and, specifically, for about one second to about one hour and, thereafter, the treatment of placing the gas barrier material in an atmosphere of a high humidity is conducted for not less than one hour and, specifically, for about 2 hours to about 14 days. In the case of the treatment (iv), the temperature of treatment is not lower than 101° C. and is, specifically, 120 to 140° C., and the treatment is conducted for not less than one second and, specifically, for about 3 seconds to about 120 minutes.

In any treatment, it is desired that the water that contains the alkaline compound of the polyvalent metal is neutral or alkaline.

Further, the treatment by using the alcohol solution containing the alkaline compound of the polyvalent metal can be conducted by applying the alcohol solution containing the alkaline compound of the polyvalent metal onto the film, sheet or coating of the above-mentioned composition for forming the gas barrier material. The alcohol solution easily infiltrates into the film of the composition for forming the gas barrier material. Therefore, the composition for forming the gas barrier material can be efficiently impregnated with the polyvalent metal, and the number of the steps or the treating time can be decreased as compared to those of the treatment with water enabling the productivity to be improved.

The solution used for the alcohol solution for containing the alkaline compound of the polyvalent metal will be methanol, ethanol or isopropanol though dependent upon the kind of the alkali compound of the polyvalent metal that is used.

There is no specific limitation on the polyvalent metal ions so far as they are capable of crosslinking the carboxyl groups of the polycarboxylic acid polymer. Examples thereof may include metal ions of alkaline earth metals (magnesium Mg, calcium Ca, strontium Sr, barium Ba, etc.), metals of the Group 8 of periodic table (iron Fe, ruthenium Ru, etc.), metals of the Group 11 of periodic table (cupper Cu, etc.), metals of the Group 12 of periodic table (zinc Zn, etc.) and metals of the Group 13 of periodic table (aluminum Al, etc.), and having a valence of, specifically, 2 or 3. Preferably, there are used divalent metal ions such as of calcium, magnesium or zinc. Further, the metal ions can be used in one kind or in a combination of two or more kinds.

As the alkaline compound of the polyvalent metal, there can be exemplified hydroxides of the above metals (e.g., magnesium hydroxide, calcium hydroxide), carbonates (e.g., magnesium carbonate, calcium carbonate), organic acid salts like carboxylates (e.g., acetates such as zinc acetate, calcium acetate, or lactates such as zinc lactate or calcium lactate). It is, however, specifically desired to use at least one of carbonate or hydroxide of calcium or magnesium from the standpoint of safety of when it is used as the resin material for packing foods and that no by-product stays in the gas barrier material at the time of forming crosslinking with metal ions.

When the alkaline compound of the polyvalent metal is contained in water, it is desired that the amount of the polyvalent metal contained in water calculated as metal atoms is not less than 0.125 mmols/L, preferably, not less than 0.5 mmols/L and, more preferably, not less than 2.5 mmols/L.

Similarly, when the alkaline compound of the polyvalent metal is contained in an alcohol solvent, it is desired that the amount of the polyvalent metal contained in the solution calculated as metal atoms is not less than 1 mmol/L, preferably, not less than 10 mmols/L and, more preferably, not less than 30 mmols/L though the amount may vary depending on the kind of the alkaline compound of the polyvalent metal contained in the alcohol solvent and the amount of application thereof.

It is desired that the gas barrier material treated with the solution containing the alkaline compound of the above polyvalent metal has its carboxyl groups of the polycarboxylic acid polymer ionically crosslinked with the polyvalent metal ions at a ratio of than 20% and, specifically, not less than 30%.

(Gas Barrier Laminate)

Figure 1:
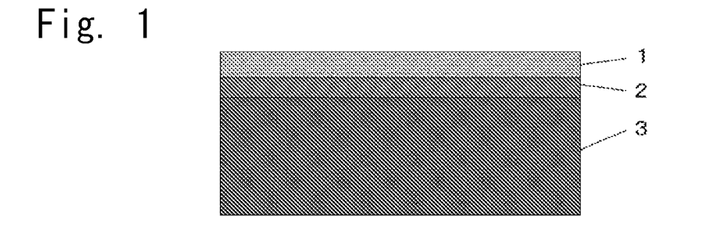
FIG. 1 is a drawing illustrating a gas barrier laminate of the present invention.

As shown in FIG. 1, it is an important feature of the present invention that the gas barrier laminate has a gas barrier layer (B) 1 which comprises the gas barrier material of the invention formed on at least one surface of a plastic base material (P) 3, and an undercoating (A) 2 containing an isocyanate compound that has at least two isocyanate groups in a molecule thereof between the plastic base material 3 and the gas barrier layer (B) 1.

In the gas barrier laminate of the present invention as described above, the undercoating (A) containing the isocyanate compound and the polyvalent metal-containing composition is formed on the plastic base material, and a solution containing the polycarboxylic acid polymer is applied onto the undercoating (A) to form the gas barrier layer (B). Therefore, the polyvalent metal ions and the isocyanate compound present in the undercoating (A) are fed into the polycarboxylic acid polymer enabling the polyvalent metal element and the nitrogen element to be present in predetermined amounts in the gas barrier layer. As a result, the polycarboxylic acid polymer is crosslinked with metal ions, most of the isocyanate compound fed into the polycarboxylic acid polymer bleeds out to the surface of the gas barrier layer so that a chemical bond stemming from the isocyanate compound is made present on the surface of the gas barrier layer, whereby the remainder of the isocyanate compound stays near the interface to the undecoatig (A) forming crosslinking between chiefly the component in the undercoating (A) and the polycarboxylic acid polymer or permitting reaction to take place among the isocyanate compounds. As a result, like in the case of the above gas barrier material, the gas barrier laminate has excellent gas barrier property and waterproof property to withstand retort sterilization, and has excellent waterproof property and anti-blocking property after the bend working.

[Undercoating]

In the gas barrier laminate of the present invention, the undercoating comprises a main resin, an isocyanate curing agent having at least two isocyanate groups in a molecule thereof and an alkaline compound of a polyvalent metal. Here, it is particularly desired that the main resin is a polyester polyol containing a metal element in the resin skeleton thereof, and that the isocyanate curing agent is a combination of a straight-chain aliphatic isocyanate compound and an alicyclic isocyanate compound having an alicyclic ring structure in the skeleton thereof.

That is, the main resin or the polyester polyol that contains a metal element in the resin skeleton thereof works as an undercoating agent to laminate the undercoating (A) on the plastic base material maintaining close adhesion. Besides, upon containing a metal element, the polyester polyol easily swells in the water-containing solvent. Upon applying a coating material that contains the polycarboxylic acid polymer, therefore, the polyester polyol swells, and the polyvalent metal ions present in the undercoating (A) can be effectively migrated into the barrier layer.

As the isocyanate curing agent, further, use is made of a straight-chain aliphatic isocyanate compound in combination with an alicyclic isocyanate compound having an alicyclic ring structure in the skeleton thereof, which have different compatibilities to the main resin. It is thus made possible to control the behavior of bleed out of the isocyanate compounds in the undercoating.

Figure 2:
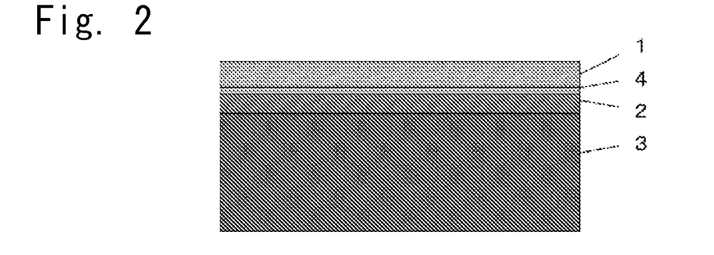
FIG. 2 is a drawing illustrating a gas barrier layer in the gas barrier laminate of the present invention.

That is, the straight-chain aliphatic isocyanate compound is highly compatible with the main resin, and homogeneously diffuses in the undercoating. On the other hand, the alicyclic isocyanate compound having an alicyclic ring structure in the skeleton thereof is poorly compatible with the main resin and, therefore, bleeds out toward the barrier layer side and the base material side of the undercoating. In particular, the alicyclic isocyanae compound having the alicyclic ring structure in the skeleton thereof is enriched on the barrier layer side of the undercoating. As shown in FIG. 2, therefore, the undercoating (A) 2 forms a region (a) 4 free of the alkaline compound of the polyvalent metal, and the nitrogen content in the region (a) 4 is becoming larger than the nitrogen content in the gas barrier layer (B) 1 other than the region (a).

[Main Resin]

As the main resin used for the undercoating of the gas barrier laminate of the present invention, it is desired to use a non-aqueous resin such as of urethane, epoxy, acrylic or polyester and that contains a metal element in the resin skeleton thereof. By introducing a metal salt into a monomer that constitutes the polymers, the metal element can be contained in the resin skeleton that is formed. Here, the "non-aqueous resin" is a concept excluding emulsion or latex dispersed in a water-containing solvent or water-soluble resin. The non-aqueous resin effectively prevents the mechanical strength of the undercoating (A) from decreasing due to excessive swelling that occurs when it comes into contact with the water-containing solvent.

A metal base that is preferably introduced into a monomer of resin should desirably contain a functional group having polarity to improve dispersion property of the polyvalent metal, and its examples will include metal salt of sulfonic acid and metal salt of phosphoric acid. As the metal element, further, there can be exemplified lithium Li, potassium K, sodium Na, magnesium Mg, calcium Ca, copper Cu and iron Fe. Here, however, a monovalent metal element is specifically desired and in the present invention, sodium sulfonate is very desirably introduced.

The present invention uses the isocyanate curing agent to attain good close adhesion to the base material and to improve dispersion property of the alkaline compound of the polyvalent metal. As the main resin for the isocyanate curing agent, therefore, there is preferably used a polyol component such as polyester polyol, polyether polyol, or urethane-modified products thereof. An urethane bond is, therefore, formed in the undercoating (A) contributing to improving close adhesion to the base material and dispersion property of the alkaline compound of the polyvalent metal. Here, if the weight of the isocyanate curing agent necessary for reacting the hydroxyl groups in the polyol component is regarded to be one equivalent, it is desired that the isocyanate curing agent is present in an amount of at least not less than 4 equivalents.

As the polyol component for forming an urethane polymer, it is desired to use a polyester polyol or an urethane-modified product thereof. As the polyester polyol component, there can be exemplified polyester polyols obtained by reacting a polyvalent carboxylic acid, a dialkyl ester thereof, or a mixture thereof with glycols or a mixture thereof.

The polyester polyol has a glass transition temperature of, preferably, −50° C. to 100° C. and, more preferably, −20° C. to 80° C. Further, the polyester polyol has a number average molecular weight of, preferably, 1,000 to 100,000 and, more preferably, 3,000 to 80,000.

As the polyvalent carboxylic acid, there can be exemplified aromatic polyvalent carboxylic acids such as isophthalic acid, terephthalic acid and naphthalenedicarboxylic acid; and aliphatic polyvalent carboxylic acids such as adipic acid, azelaic acid, sebacic acid and cyclohexanedicarboxylic acid.

As the glycol, exemplified ethylene glycol, propylene glycol, diethylene glycol, butylene glycol, neopentyl glycol and 1,6-hexanediol.

In the present invention, the polyol component or the polyvalent carboxylic acid component to which the metal base is introduced is copolymerized to obtain a non-aqueous resin having a metal element in the resin skeleton.

As the polyvalent carboxylic acid into which the metal base is introduced, there can be exemplified such metal salts as sulfoterephthalic acid, 5-sulfoisophthalic acid, 4-sulfonaphthalene-2,7-dicarboxylic acid, and 5[4-sulfophenoxy] isophthalic acid. As the polyol into which the metal base is introduced, there can be exemplified such metal salts as 2-sulfo-1,4-butanediol and 2,5-dimethyl-3-sulfo-2,5-hexanediol. Specifically desired is a 5-sodiumsulfoisophthalic acid.

It is desired that the component into which the metal salt is introduced is copolymerized in an amount of 0.01 to 10 mol %. If the amount thereof is smaller than the above range, the polyvalent metal ions cannot be migrated to a sufficient degree. If the amount thereof is larger than the above range, on the other hand, the waterproof property becomes poor.

If the metal element has been contained in the resin skeleton of the non-aqueous resin can be detected by, for example, analyzing the starting resin with fluorescent X-rays. (Measuring conditions using a fluorescent X-ray analyzer) Device used: ZSX100e manufactured by Rigaku Denki Co.

Measuring conditions: Object to be measured, Na-Kα ray
  Measuring diameter, 30 mm
  X-ray output, 50 kV-70 mA
  Measuring time, 40 seconds

[Isocyanate Curing Agent]

As the isocyanate curing agent used in the present invention, it is particularly desired as described above to use the straight-chain aliphatic isocyanate compound in combination with the alicyclic isocyanate compound having an alicyclic ring structure in the skeleton thereof.

It is, further, desired that the straight-chain aliphatic isocyanate compound and the alicyclic isocyanate compound are blended at a weight ratio of 60:40 to 15:85 and, specifically, 55:45 to 30:70. If the amount of the straight-chain aliphatic isocyanate compound is smaller than the above range, the adhering property is not obtained to a sufficient degree. If the amount of the alicyclic isocyanate compound is smaller than the above range, further, it becomes difficult to form the region (a).

As the straight-chain aliphatic isocyanate, there can be exemplified tetramethylene diisocyanate, 1,6-hexamethylenediisocyanate, dodecamethylenediisocyanate and trimethylhexamethylenediisocyanate. Among them, it is desired to use the one having an isocyanulate structure. Concretely, there can be favorably used an isocyanulate having a 1,6-hexamethylenediisocyanate as a structural unit.

As the alicyclic isocyanate compound having an alicyclic ring structure in the skeleton, further, there can be exemplified 1,3-cyclohexylenediisocyanate, 4-cyclohexylenediisocyanate, hydrogenated xylylenediisocyanate, lizinediisocyanate, isophoronediisocyanate, 4,4'-dicyclohexylmethanediisocyanate, and 3,3'-dimethyl-4,4'-dicyclohexylmethanediisocyanate. Among them, the isophoronediisocyanate and its derivatives can be desirably used.

As the straight-chain aliphatic polyisocyanate compound and the alicyclic isocyanate compound, there can be used polyfunctional polyisocyanate compounds such as isocyanulate derived from the polyisocyanate monomer, biuret and allophanate, or polyfunctional polyisocyanate compounds containing a terminal isocyanate group obtained by the reaction with a trifunctional or more highly functional polyol compound such as trimethylolpropane or glycerin.

In the undercoating of the gas barrier laminate of the invention, it is desired that the straight-chain aliphatic isocyanate compound has a glass transition temperature (Tg) of not higher than −20° C., a number average molecular weight (Mn) of not more than 1200 and, specifically, a glass transition temperature (Tg) of not higher than −40° C. and a number average molecular weight (Mn) of not more than 1100 from such a standpoint that it easily and homogeneously diffuses in the undercoating while the solvent is being volatilized. It is, further, desired that the alicyclic isocyanate compound has a glass transition temperature (Tg) of not lower than 50° C., a number average molecular weight (Mn) of not less than 400 and, specifically, a glass transition temperature (Tg) of not lower than 60° C. and a number average molecular weight (Mn) of not less than 500 from such a standpoint that it stays on the barrier layer side or on the plastic base material side of the undercoating (A) to easily form the region (a).

[Alkaline Compound of a Polyvalent Metal]

As the alkaline compound of a polyvalent metal contained in the undercoating, there can be used those exemplified for the above gas barrier materials. Here, however, it is desired that the surfaces of particles of the alkaline compound of the polyvalent metal have not been chemically treated from such a standpoint that the alkaline compound of the polyvalent metal quickly dissolves in the gas barrier layer of the polycarboxylic acid polymer when it has migrated therein.

Particles of the alkaline compound of the polyvalent metal may often remain in the portions other than the region (a) of the undercoating (A) of the gas barrier laminate. Through dependent on the amount of the particles that are remaining, the transparency of the gas barrier laminate may slightly decrease if the primary particle size of the particles exceeds 0.5 μm. It is, therefore, desired that the primary particle size of particles of the alkaline compound of the polyvalent metal is not larger than 0.5 μm and, specifically desirably, is not larger than 0.4 μm. The primary particle size of particles of the alkaline compound of the polyvalent metal can be found by observing secondary electron images thereof by using a scanning electron microscope.

Presuming that two carboxyl groups react with one polyvalent metal ion, it is desired in the present invention that the composition for forming the undercoating (A) (hereinafter "composition (A') for forming the undercoating") contains the alkaline compound of the polyvalent metal in an amount of not less than 0.4 equivalents relative to the carboxyl groups of the polycarboxylic acid polymer in the composition for forming the gas barrier layer (B) (hereinafter "composition (B') for forming the gas barrier layer") calculated as metal atoms and, specifically, in an amount of not less than 0.6 equivalents therefore for the use of retort sterilization for it maintains gas barrier property after the retort sterilization. If the content of the alkaline compound of the polyvalent metal is smaller than the above range, the polycarboxylic acid polymer cannot be crosslinked to a sufficient degree and it becomes difficult to maintain the gas barrier property.

It is, further, desired that the content of the resin component in the composition (A') for forming the undercoating is adjusted to be 15 to 80% by weight and, specifically, 20 to 60% by weight.

In the composition (A') for forming the undercoating, further, it is desired that the resin component is a non-aqueous component and can be prepared by using a solvent such as toluene, 2-butanone, cyclohexanone, sorbesso, isophorone, xylene, ethyl acetate or butyl acetate but, specifically desirably, is prepared by using a low-boiling solvent so that the coating can be formed at a low temperature. These solvents may be dissolved in a single solution or in a mixed solution, or the solutions of the components may be mixed together to prepare the resin component.

In addition to the above components, there can be, further, used widely known cure-accelerating catalyst, filler, softening agent, antiaging agent, stabilizer, adhesion promoter, leveling agent, defoaming agent, plasticizer, inorganic filler, stickiness-imparting resin, fibers, coloring agent such as pigment, usable time-extending agent and the like.

[Composition for Forming the Gas Barrier Layer]

The composition (B') for forming the gas barrier layer may be the same as the above-mentioned composition for forming the gas barrier material but contains no isocyanate compound.

In the composition for forming the gas barrier layer, it is essential that the solvent contains water so that the alkaline compound of the polyvalent metal is dissolved therein and migrates into the composition (B') for forming the gas barrier layer. It is, further, desired to mix together the water and the organic solvent having good affinity to the undercoating (A) from the standpoint of improving affinity to the undercoating (A) and promoting the migration of the alkaline compound of the polyvalent metal into the composition (B') for forming the gas barrier layer. As the organic solvent having good affinity to the undercoating (A), though it may be dependent upon the resin component used for the composition (A') for forming the undercoating but if, for example, an urethane polymer is used, then there can be preferably used alcohols such as methanol, ethanol and isopropanol, or ketones such as 2-butanone and acetone.

Further, from the standpoint of controlling the amount of migration of the isocyanate compound into the composition (B') for forming the gas barrier layer, it is desired that the above-mentioned organic solvent is used in an amount of not more than 1900 parts by weight, preferably, 5 to 900 parts by weight and, more preferably, 10 to 400 parts by weight per 100 parts by weight of water.

[Plastic Base Material]

As the plastic base material (P) for forming the undercoating (A), there can be used a film, a sheet, or a packing material of any shape such as bottle, cup, tray or can produced from a heat-formable thermoplastic resin by such means as extrusion forming, injection forming, blow forming, stretch-blow forming or press forming.

Preferred examples of the resin for constituting the plastic base material include olefin copolymers such as low-, intermediate- or high-density polyethylene, linear low-density polyethylene, polypropylene, ethylene-propylene copolymer, ethylene-butene copolymer, ionomer, ethylene-vinyl acetate copolymer and ethylene-vinyl alcohol copolymer; polyesters such as polyethylene terephthalate, polybutylene terephthalate, polyethylene terephthalate/isophthalate and polyethylene naphthalate; polyamides such as nylon 6, nylon 6,6, nylon 6,10, and metaxylyleneadipamide; styrene copolymers such as polystyrene, styrene-butadiene block copolymer, styrene-acrylonitrile copolymer, styrene-butadiene-acrylonitrile copolymer (ABS resin); vinyl chloride copolymers such as polyvinyl chloride and vinyl chloride-vinyl acetate copolymer; acrylic copolymers such as polymethyl methacrylate, methyl methacrylate ethyl acrylate copolymer; and polycarbonate.

These thermoplastic resins may be used alone or in a blend of two or more kinds. Further, the plastic base material may be of a single-layer constitution or a laminated constitution of two or more layers obtained by, for example, a simultaneous melt extrusion or any other lamination method.

As required, further, the above melt-formable thermoplastic resin can be blended with one or two or more kinds of additives such as pigment, antioxidant, antistatic agent, ultraviolet ray absorber and lubricant in a total amount in a range of 0.001 to 5.0 parts per 100 parts by weight of the above resin.

To reinforce the container, further, the thermoplastic resin may be blended with a fiber reinforcing material such as glass fiber, aromatic polyamide fiber, carbon fiber, pulp, or cotton linter, or powdery reinforcing material such as carbon black or white carbon, or flaky reinforcing material such as glass flakes or aluminum flakes in one or two or more kinds and in a total amount of 2 to 150 parts by weight per 100 parts by weight of the thermoplastic resin, and may be, further, blended, as a filler, with heavy or soft calcium carbonate, mica, talc, kaolin, gypsum, clay, barium sulfate, alumina powder, silica powder or magnesium carbonate in one or two or more kinds in a total amount of 5 to 100 parts by weight per 100 parts by weight of the thermoplastic resin according to a known recipe.

To improve gas barrier property, further, a scale-like inorganic fine powder such as water-swelling mica or clay may be added in a total amount of 5 to 100 parts by weight per 100 parts by weight of the thermoplastic resin according to a known recipe.

Similarly, to improve gas barrier property, an inorganic thin layer such as of silicon oxide or aluminum oxide may be formed on the plastic base material by a physical or chemical gas phase vapor deposition method.

The plastic base material may be a final film or sheet, or a formed article such as container, or the film may be formed in advance on a pre-formed article that is to be formed into a container. As the pre-formed article, there can be exemplified a cylindrical parison with or without bottom that is to be biaxially stretch-blow formed, a pipe from which plastic cans are to be formed, a sheet that is to be vacuum-formed, pressure-formed or plug-assist formed, or a film for heat-seal lids and for forming bags.

[Production of the Gas Barrier Laminate]

The gas barrier laminate of the present invention is obtained by, first, applying the above-mentioned composition (A') for forming the undercoating on at least one surface of the above plastic base material (P).

The amount of applying the composition (A') for forming the undercoating is determined depending on the resin component in the composition (A') for forming the undercoating and upon the amount of feeding the alkaline compound of the polyvalent metal, and cannot be exclusively specified. It is, however, desired that the composition (A') for forming the undercoating is applied in such an amount that the amount of the resin component in the layer (A) that is formed is in a range of 0.02 to 5.0 g/m$^2$ and, specifically, 0.1 to 2.5 g/m$^2$ and that the amount of the polyvalent metal ions is, as described above, not less than 0.4 equivalents relative to the carboxyl groups of the polycarboxylic acid polymer in the composition (B') for forming the gas barrier layer that is applied next. If the amount of the resin component is smaller than the above range, it becomes difficult to firmly adhere the undercoating (A) to the plastic base material (P). Even if the amount of the resin is larger than the above range, on the other hand, there is obtained no particular advantage but disadvantage in economy.

The composition (A') for forming the undercoating applied onto the plastic base material (P), though dependent upon the kind of the coating material that is used and the amount of application, can be turned into the undercoating (A) upon being dried at a temperature of 50 to 200° C. for 0.5 seconds to 5 minutes and, specifically, at a temperature of 60 to 140° C. for one second to 2 minutes. Thus the undercoating (A) can be economically formed without affecting the plastic base material.

Next, the composition (B') for forming the gas barrier layer is applied onto the undercoating (A) that is formed.

The amount of the polycarboxylic acid polymer, i.e., the amount of the free carboxyl groups contained in the composition (B') for forming the gas barrier layer, is not less than at least 150 KOHmg/g and, specifically, in a range of 250 to 970 KOHmg/g in terms of the acid value.

It is desired that the composition (B') for forming the gas barrier layer is applied in an amount in a range of 0.3 to 4.5 g/m$^2$ and, specifically, 0.5 to 3.0 g/m$^2$ in the dry state of the resin component only of before the ionic crosslinking is being formed in the gas barrier layer (B). If the amount of application is smaller than the above range, the gas barrier property is not attained to a sufficient degree. Even if the amount of the resin is larger than the above range, on the other hand, there is obtained no particular advantage but disadvantage in economy.

Next, the applied composition (B') for forming the gas barrier layer is heat-treated. Through the heat treatment, the polyvalent metal ions and the isocyanate compound in the undercoating (A) migrate into the composition (B') for forming the gas barrier layer to form a structure that is crosslinked with metal ions among the carboxyl groups of the polycarboxylic acid polymer, and the nitrogen element stemming from the isocyanate compound is made present near the interface between the surface of the gas barrier layer and the undercoating. Specifically, most of the isocyanate compound that has migrated into the composition (B') for forming the gas barrier bleeds out toward the surface of the gas barrier layer to form a chemical bond stemming from the isocyanate compound in the surface of the gas barrier layer.

The composition (B') for forming the gas barrier layer is heated under the conditions of a temperature of 40 to 110° C. and, specifically, 50 to 100° C. for one second to one minute and, preferably, 2 seconds to 30 seconds.

The composition (A') for forming the undercoating and the composition (B') for forming the gas barrier layer can be applied and dried or heat-treated according to a conventional method.

As for the method of application, though not limited thereto only, the compositions can be applied by, for example, spray-coating, dipping or by using a bar coater, a roll coater or a gravure coater.

The drying or heat treatment can be conducted by oven-drying (heating), infrared-ray heating or high-frequency heating.

EXAMPLES

The invention will be further described by way of Examples which, however, are in no way to limit the invention.

(Amount of Oxygen Permeation)

The amount of oxygen that has permeated through the obtained laminate of plastic films was measured by using an oxygen permeation measuring instrument (OX-TRAN 2/20 manufactured by Modern Control Co.). The amount of oxygen permeation was also measured after the retort treatment conducted at 121° C. for 30 minutes. The measuring conditions consisted of an environmental temperature of 25° C. and a relative humidity of 80%.

(Evaluating the flexibility)

The obtained laminate of plastic films was subjected to the retort sterilization treatment at 121° C. for 30 minutes and was, thereafter, cut into a size of 130 mm×100 mm, and from which a cylinder 30 mm in diameter and 130 mm in length was formed and was attached to the Gelboflex tester. By using the Gelboflex tester, a crushing treatment was conducted 200 times in an environment of a temperature of 23° C. and a relative humidity of 50% RH. Each crushing treatment consisted of a twisting motion (twisting angle of 180 degrees, length of motion of 60 mm) and a horizontal motion (length of motion of 20 mm). Thereafter, the amount of oxygen permeation was measured as described above.

Contents of the monovalent metal element, polyvalent metal element and nitrogen element in the gas barrier material were measured according to the methods described below.

(Contents of the Monovalent Metal Element and Polyvalent Metal Element)

After the gas barrier material comprising the polycarboxylic acid polymer was dipped in an alkaline solution and dissolved therein, a solid material thereof that was dried solid after having evaporated the solvent, was incinerated in an oven. The ash that was obtained was analyzed by using the ICP emission spectroscope (iCAP6000 manufactured by Thermo-Fisher Scientific Co.) to analyze the weight ratios of the monovalent metal element and the polyvalent metal element in the gas barrier material.

(Content of the Nitrogen Element)

After the gas barrier material comprising the polycarboxylic acid polymer was dipped in the alkaline solution and dissolved therein, a solid material thereof that was dried solid after having evaporated the solvent, was burned by using the organic element analyzer (Thermoquest, Model EA1110, manufactured by CE Instruments Co.) to analyze the nitrogen element.

(Content of the Nitrogen Element in the Surface of the Layer (B))

The surface of the obtained gas barrier material was analyzed by using the XPS (Quantum-2000 manufactured by ULVAC-PHI Co.) to measure the content of nitrogen per the total amount of carbon, oxygen and nitrogen in the surface layer.

(Amounts of Nitrogen in the Layer (A) and in the Region (a)).

The amounts of nitrogen per the total amount of oxygen and nitrogen in the regions were measured according to the following methods.

Region (a): The obtained plastic film was dipped in an alkaline aqueous solution so that the layer (B) was dissolved and, thereafter, the surface that was exposed was analyzed for its composition by using the XPS.

Layer (A): The obtained plastic film was cut aslant, and the corresponding region was analyzed for its composition by using the XPS.

(Ionic Crosslinking Ratio)

The gas barrier laminate after it has been ionically crosslinked was measured by using the Fourier-transform infrared spectrophotometer to calculate its ionic crosslinking ratio. Formation of the ionic crosslinking converts the carboxylic acid into a carboxylate. It has been known that the carboxylic acid has characteristic absorption bands, usually, over the wavelengths of nearly 920 to 970 cm$^{-1}$, nearly 1700 to 1710 cm$^{-1}$ and nearly 2500 to 3200 cm$^{-1}$, and the acid anhydride thereof has it over the wavelengths of nearly 1770 to 1800 cm$^{-1}$. It has also been known that the carboxylate has a characteristic absorption band over the wavelengths of nearly 1480 to 1630 cm$^{-1}$. The ionic crosslinking ratio is calculated by using the heights of peaks of the carboxylic acid and acid anhydride thereof over the wavelength region of 1600 to 1800 cm$^{-1}$ and the height of a peak of the carboxylate over the wavelength region of 1480 to 1630 cm$^{-1}$. More preferably, there are used the heights of peaks over the wavelength regions of 1695 to 1715 cm$^{-1}$ (i) and 1540 to 1610 cm$^{-1}$ (ii). The infrared absorption spectra of the samples are detected, and absorbencies over the wavelengths of (i) and (ii) are measured to obtain the heights of peaks. The carboxylic acid and the carboxylates are regarded to have the same absorbency coefficient, and a conversion of the carboxyl groups into a salt thereof (ratio of conversion of the carboxylic acid into the carboxylate) is calculated, i.e., the ionic crosslinking ratio X is calculated according to the following formula (1), $$X = \text{height of peak in }(ii)/[\text{height of peak in }(i)+\text{height of peak in }(ii)] \quad (1)$$

Heights of peaks in (i) and (ii) stand for differences of absorbency between the peaks and the points at where hems of the peaks meet the base line.

(Measuring Conditions for the Fourier-Transform Infrared Spectrophotometer)

Instrument used: FTS 7000 Series manufactured by Digilab Co.

Method of measurement: One-time reflection method using a germanium prism.

Measured wavelength region: 4000 to 700 cm$^{-1}$ (Evaluating the Appearance)

To evaluate the appearance, the obtained gas barrier material was measured for its 60-degree specular brilliance by using a digital angle-variable glossimeter (UGV-5K manufactured by Suga Shikenki Co.). The gas barrier material having a 60-degree specular brilliance equivalent to that of a PET film (P60 12 μm, manufactured by Toray Co.) of before being coated was evaluated to have appearance ⊚, and the barrier material having luster inferior to that of the PET film of before being coated was evaluated to have appearance X.

(Waterproof Property after Life Bend Working)

The obtained laminate of plastic films was folded into three along two folding lines, fixed in this state and stored in a state of being dipped in water maintained at 5° C. Thereafter, the laminate was taken out from water to make sure if the gas barrier laminate developed peeling at the folded portions. If one or more portions were peeling after stored for 3 days, the waterproof property of the laminate after the bend working was evaluated to be X. If the laminate had not been peeled at all after stored for 5 days, the waterproof property after the bend working was evaluated to be ⊚.

Example 1

Apolyacrylic acid (AC-10 LHP, Mw=250,000, manufactured by Toa Gosei Co.) was added as the polycarboxylic acid polymer to a mixed solvent of methanol/2-propanol/MEK/water mixed solvent (weight ratio of 25/25/40/10) in such an amount that the solid component thereof was 6% by weight, and an aqueous solution containing 20% of sodium hydroxide was added thereto in such an amount that the neutralization degree was 2.5% relative to the polyarylic acid to thereby obtain a solution (B'). Into the solution (B') was added a straight-chain aliphatic polyisocyanate (Sumidur N3300, isocyanulate type based on 1,6-hexamethylene diisocyanate, solid component 100%, Tg=−60° C., Mn=680, manufactured by Sumika Bayer Urethane Co.) in an amount of 0.4% by weight relative to the polyester polyol, and to which was added an alicyclic polyisocyanate (Desmodur Z4470, isocyanulate type based on isophorone diisocyanate, with butyl acetate dissolved therein, solid component 70%, Tg=70° C., Mn=1200, manufactured by Sumika Bayer Urethane Co.) in such an amount that the weight thereof exclusive of the solvent was 0.4% by weight relative to the polyester polyol to thereby obtain a coating solution (B") for obtaining a barrier material precursor. The above coating solution was applied by using a bar coater onto a 12 μm-thick biaxially stretched polyethylene terephthalate film followed by a heat treatment by using a conveyer type electric oven under the conditions of a temperature of 105° C. and a pass time of 40 seconds to obtain a film having the barrier material precursor.

Into one liter of tap water was added calcium chloride in an amount calculated as metal of 360 mmols (40 g) followed by the addition of 11 g of calcium hydroxide to adjust the pH to be 12.0 (as measured at a water temperature of 24° C.). Thereafter, the solution was heated at 40° C., stirred well, and in which the film having the barrier material precursor was dipped for 3 seconds. The film was taken out from the hot water and was dried to obtain a film having the barrier material.

Figure 3:
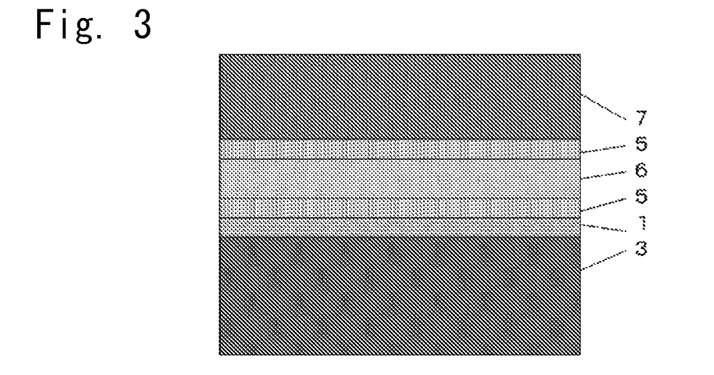
FIG. 3 is a drawing illustrating a structure in cross section of a laminate 1 prepared in Example 1.

Onto the barrier material were laminated an urethane adhesive in a thickness of 2 μm, a biaxially stretched nylon film having a thickness of 15 μm, an urethane adhesive in a thickness of 2 μm and an unstretched polypropylene film having a thickness of 70 μm in this order to obtain a laminate having a layer constitution as shown in FIG. 3.

Example 2

To one liter of a water/ethanol mixed solvent (weight ratio of 30/70) was added the calcium chloride in an amount calculated as metal of 720 mmols (80 g) followed by the addition of 22 g of calcium hydroxide to obtain a coating solution. The above coating solution was applied by using the bar coater onto the barrier material precursor of the film of Example 1 and was dried to obtain the film having the barrier material.

Onto the barrier material were laminated the urethane adhesive in a thickness of 2 μm, the biaxially stretched nylon film having a thickness of 15 μm, the urethane adhesive in a thickness of 2 μm and the unstretched polypropylene film having a thickness of 70 μm in this order to obtain a laminate having a layer constitution as shown in FIG. 3.

Example 3

A film having a barrier material and a laminate thereof were obtained by the same method as that of Example 2 but adding the potassium hydroxide to the solution (B') instead of adding the sodium hydroxide, and adding a magnesium chloride and a magnesium hydroxide to the coating solution instead of adding the calcium chloride and calcium hydroxide.

Example 4

A polyester polyol (Vylon 200 manufactured by Toyo Boseki Co.) was dissolved in an ethyl acetate/MEK mixed solvent (weight ratio of 65/35) to obtain a solution thereof of a concentration of 14% by weight. Into the solution was added the straight-chain aliphatic polyisocyanate (Sumidur N3300, manufactured by Sumika Bayer Urethane Co.) in an amount of 20% by weight relative to the polyester polyol, and to which was added the alicyclic polyisocyanate (Desmodur 24470, manufactured by Sumika Bayer Urethane Co.) in such an amount that the weight thereof exclusive of the solvent was 20% by weight relative to the polyester polyol, and the above mixed solvent was added so as to adjust the total solid component to be 14% by weight to thereby obtain a coating solution for forming an anchor layer. The above coating solution was applied by using the bar coater onto a 12 μm-thick biaxially stretched polyethylene terephthalate film followed by a heat treatment by using a box type electric oven under the conditions of a temperature of 70° C. and a treating time of 2 minutes to obtain a polyethylene terephthalate film having the anchor layer of a thickness of 0.3 μm. Onto the anchor layer of the polyethylene terephthalate film was applied by using the bar coater the coating solution (B") for forming the barrier material precursor of Example 1 followed by a heat treatment by using a conveyer type electric oven under the conditions of a temperature of 105° C. and a pass time of 40 seconds to obtain a film having the barrier material precursor.

To one liter of tap water was added the calcium chloride in an amount calculated as metal of 360 mmols (40 g) followed by the addition of 11 g of calcium hydroxide to adjust the pH to 12.0 (as measured at a water temperature of 24° C.). Thereafter, the solution was heated at 40° C., stirred well, and in which the film having the barrier material precursor was dipped for 3 seconds. The film was taken out from the hot water and was dried to obtain a film having the barrier material.

Figure 4:
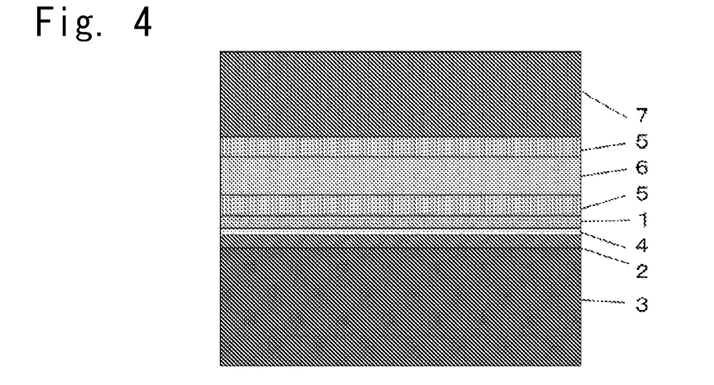
FIG. 4 is a drawing illustrating a structure in cross section of a laminate 2 prepared in Example 4.

Onto the barrier material were laminated the urethane adhesive in a thickness of 2 μm, the biaxially stretched nylon film having a thickness of 15 μm, the urethane adhesive in a thickness of 2 μm and the unstretched polypropylene film having a thickness of 70 μm in this order to obtain a laminate having a layer constitution as shown in FIG. 4.

Example 5

Two kinds of polyester polyols, i.e., Vylon 200 (non-aqueous resin containing no metal element in the resin skeleton as confirmed by using fluorescent X-rays, manufactured by Toyo Boseki Co.) and Vylon GK570 (non-aqueous resin containing a metal element in the resin skeleton as confirmed by using fluorescent X-rays, manufactured by Toyo Boseki Co.) at a weight ratio of 50/50 were dissolved in an ethyl acetate/MEK mixed solvent (weight ratio of 65/35). To the above solution was added a calcium carbonate (CS3N-A, primary particle size of 0.3 μm, manufactured by Ube Materials Co.) in a manner that the amount thereof was 280% by weight to adjust the total solid component to be 35%. The mixture was then mill-dispersed with glass beads (BZ-04 manufactured by Toshin-Riko Co.) to obtain a paste thereof. Into the paste was added the straight-chain aliphatic polyisocyanate (Sumidur N3300, manufactured by Sumika Bayer Urethane Co.) in an amount of 20% by weight relative to the polyester polyol, and to which was added the alicyclic polyisocyanate (Desmodur 24470, manufactured by Sumika Bayer Urethane Co.) in such an amount that the weight thereof exclusive of the solvent was 20% by weight relative to the polyester polyol, and the above mixed solvent was added so as to adjust the total solid component to be 25% by weight to thereby obtain a coating solution (A") comprising the coating composition (A') that contains the alkaline compound of the polyvalent metal.

The above coating solution (A") was applied by using the bar coater onto the 12 μm-thick biaxially stretched polyethylene terephthalate film (P) followed by a heat treatment by using the box type electric oven under the conditions of a temperature of 70° C. and a treating time of 2 minutes to obtain a polyethylene terephthalate film having a layer A that corresponded to the layer (A) that was applied in an amount of 1.4 g/m$^2$.

A polyacrylic acid (AC-10 LP, Mw=25,000, manufactured by Toa Gosei Co.) was added as the polycarboxylic acid polymer to a mixed solvent of water/acetone (weight ratio of 80/20) in such an amount that the solid component thereof was 10% by weight, and an aqueous solution containing 20% of sodium hydroxide was added thereto in such an amount that the neutralization degree was 2.5% relative to the polyarylic acid to thereby obtain a solution (B').

The solution (B') was applied by using the bar coater onto the layer A of the polyethylene terephthalate film in an amount of 1.5 g/m² to obtain a precursor layer (BO). Here, the amount of application of the precursor layer (BO) is the amount of the solution (B') that is directly applied onto the biaxially stretched polyethylene terephthalate film and is dried, i.e., the amount of the solution (B') after only polyacrylic acid in the solution (B') it dried without forming the ionic crosslinking. Upon heat-treating the above film after having been applied in the conveyer type electric oven under the conditions of a temperature of 80° C. and a pass time of 5 seconds, there was obtained a polyethylene terephthalate film having, on the layer (A) thereof, a layer (B) having crosslinking formed in the precursor layer (BO).

With the coating of the gas barrier laminate as the lower layer, there were laminated a 2-μm thick urethane adhesive layer, a 15-μm thick biaxially stretched nylon film, a 2-μm thick urethane adhesive layer and a 70-μm thick unstretched polypropylene film in this order to obtain a laminate of a layer constitution as shown in FIG. 4.

Example 6

A laminate was obtained by the same method as that of Example 5 but changing the weight ratio of the water/acetone mixed solvent in the solution (B') into 20/80.

Example 7

A laminate was obtained by the same method as that of Example 5 but changing the neutralization degree to the polyacrylic acid in the solution (B') into 0.4%.

Example 8

A laminate was obtained by the same method as that of Example 5 but changing the neutralization degree to the polyacrylic acid in the solution (B') into 4.5%.

Example 9

A laminate was obtained by the same method as that of Example 5 but changing the weight ratio of the water/acetone mixed solvent in the solution (B') into 90/10.

Example 10

A laminate was obtained by the same method as that of Example 5 but adding the straight-chain aliphatic polyisocyanate in an amount of 30% by weight relative to the polyester polyol, adding the alicyclic polyisocyanate in such an amount that the weigh thereof exclusive of the solvent was 30% by weight relative to the polyester polyol, and changing the weight ratio of the water/acetone mixed solvent in the solution (B') into 30/70.

Example 11

A laminate was obtained by the same method as that of Example 5 but using an aqueous solution containing 20% of potassium hydroxide instead of using the aqueous solution containing 20% of sodium hydroxide in the solution (B').

Example 12

A laminate was obtained by the same method as that of Example 5 but using the magnesium carbonate (manufactured by Wako-Junyaku Co.) instead of using the calcium carbonate in the coating solution (A") and applying the layer (A) in an amount of 1.2 g/m².

Example 13

A laminate was obtained by the same method as that of Example 5 but using the calcium hydroxide (manufactured by Wako-Junyaku Co.) instead of using the calcium carbonate in the coating solution (A") and applying the layer (A) in an amount of 1.1 g/m².

Example 14

A laminate was obtained by the same method as that of Example 5 but using the Vylon 550 (non-aqueous resin containing no metal element in the resin skeleton as confirmed by using fluorescent X-rays, manufactured by Toyo Boseki Co.) instead of using the Vylon GK570 in the coating solution (A").

Example 15

A laminate was obtained by the same method as that of Example 5 but, instead of using the Desmodur 24470, using the Takenate D110N (adduct type based on the xylylene diisocanate, solid component, 75%, manufactured by Mitsui Kagaku Co.) in such an amount that the weight thereof exclusive of the solvent was 20% by weight relative to the polyester polyol.

Example 16

A laminate was obtained by the same method as that of Example 5 but, instead of using the Sumidur N3300, using the Sumidur HT (adduct type based on the 1,6-hexamethylene diisocyanate, solid component, 75%, manufactured by Sumika Bayer Urethane Co.) in such an amount that the weight thereof exclusive of the solvent was 20% by weight relative to the polyester polyol.

Comparative Example 1

A laminate was obtained by the same method as that of Example 1 but adding the straight-chain aliphatic polyisocyanate (Sumidur N3300 manufactured by Sumika Bayer Urethane Co.) in an amount of 20% by weight relative to the polyester polyol and without adding the alicyclic polyisocyanate (Desmodur 24470 manufactured by Sumika Bayer Urethane Co.

Comparative Example 2

A laminate was obtained by the same method as in Example 5 but changing the weight ratio of the water/acetone mixed solvent in the solution (B') into 15/85.

Comparative Example 3

A laminate was obtained by the same method as that of Example 5 but changing the neutralization degree to the polyacrylic acid in the solution (B') into 0.2%.

Comparative Example 4

A laminate was obtained by the same method as that of Example 5 but changing the neutralization degree to the polyacrylic acid in the solution (B') into 5.0%.

Comparative Example 5

A laminate was obtained by the same method as that of Example 5 but changing the weight ratio of the water/acetone mixed solvent in the solution (B') into 100/0.

Comparative Example 6

A laminate was obtained by the same method as that of Example 5 but adding the straight-chain aliphatic polyisocyanate in an amount of 35% by weight relative to the polyester polyol, adding the alicyclic polyisocyanate in such an amount that the weigh thereof exclusive of the solvent was 35% by weight relative to the polyester polyol, and changing the weight ratio of the water/acetone mixed solvent in the solution (B') into 30/70.

TABLE 1

| | AC layer | *1 | | *6 | *7 | | Method | *10 | | | | Remarks |
|---|---|---|---|---|---|---|---|---|---|---|---|---|
| | | *2 | *4 | AC-10LHP | *8 | *9 | | *11 | | *13 | | |
| | | *3 | *5 | | | | | *12 | *12 | *14 | *15 | |
| Ex. 1 | no | 0.4 | 0.4 | 100 | 2 | | dipping | *16 360 | *18 140 | 100 | 0 | |
| Ex. 2 | no | 0.4 | 0.4 | 100 | 2 | | coating | *16 720 | *18 280 | 30 | 70 | |
| Ex. 3 | no | 0.4 | 0.4 | 100 | | 2 | coating | *17 720 | *19 280 | 30 | 70 | |
| Ex. 4 | yes | 0.4 | 0.4 | 100 | 2 | | dipping | *16 360 | *19 140 | 100 | 0 | with AC layer |
| Comp. Ex. 1 | no | 20 | | 100 | 2 | | dipping | *18 360 | *19 140 | 100 | 0 | |

*1: Isocyanate curing agent,
*2: Aliphatic,
*3: Sumidur N3300 (HDI-nulate) (wt %),
*4: Alicyclic,
*5: Desmodur Z4470 (IPDI-nulate) (wt %),
*6: Polyacrylic acid,
*7: Monovalent metal element,
*8: Sodium hydroxide, Neutralization degree (%),
*9: Pottasium hydroxide, Neutralization degree (%),
*10: Crosslinking with polyvalent metal ions,
*11: Alkaline compound of polyvalent metal,
*12: Kind, Concentration (mmols/L),
*13: Solvent composition (weight ratio),
*14: Water,
*15: Ethanol,
*16: Ca chloride,
*17: Mg chloride,
*18: Ca hydroxide,
*19: Mg hydroxide

TABLE 2

| | *1 | | | | | | | | *16 | | | | | |
|---|---|---|---|---|---|---|---|---|---|---|---|---|---|---|
| | *2 | | | *6 | | | | *13 | *17 | *19 | *22 | | | |
| | | | | *7 | *10 | | | | | | | | | |
| | *3 | *4 | *5 | *8 | *9 | *11 | *12 | *14 | *15 | *18 | *20 | *21 | *23 | *24 | Remarks |
| Ex. 5 | 50 | 50 | | 20 | 20 | | | *25 200 | 0.9 | 100 | 2.5 | | 80 | 20 | |
| Ex. 6 | 50 | 50 | | 20 | 20 | | | *25 200 | 0.9 | 100 | 2.5 | | 20 | 80 | |
| Ex. 7 | 50 | 50 | | 20 | 20 | | | *25 200 | 0.9 | 100 | 0.4 | | 80 | 20 | |
| Ex. 8 | 50 | 50 | | 20 | 20 | | | *25 200 | 0.9 | 100 | 4.5 | | 80 | 20 | |
| Ex. 9 | 50 | 50 | | 20 | 20 | | | *25 200 | 0.9 | 100 | 2.5 | | 90 | 10 | |
| Ex. 10 | 50 | 50 | | 30 | 30 | | | *25 200 | 0.9 | 100 | 2.5 | | 30 | 70 | |
| Ex. 11 | 50 | 50 | | 20 | 20 | | | *25 200 | 0.9 | 100 | | 2.5 | 80 | 20 | |

TABLE 2-continued

| | *1 | | | | | | | | | | | | | | |
|---|---|---|---|---|---|---|---|---|---|---|---|---|---|---|---|
| | *2 | | | *6 | | | | *13 | | *16 | | | | | |
| | | | | *7 | | *10 | | | | *17 | *19 | | *22 | | |
| | *3 | *4 | *5 | *8 | *9 | *11 | *12 | *14 | *15 | *18 | *20 | *21 | *23 | *24 | Remarks |
| Ex. 12 | 50 | 50 | | 20 | | 20 | | *26 200 | 0.9 | 100 | 2.5 | | 80 | 20 | |
| Ex. 13 | 50 | 50 | | 20 | | 20 | | *27 200 | 0.9 | 100 | 2.5 | | 80 | 20 | |
| Ex. 14 | 50 | | 50 | 20 | | 20 | | *25 200 | 0.9 | 100 | 2.5 | | 80 | 20 | *28 |
| Ex. 15 | 50 | 50 | | 20 | | | 20 | *25 200 | 0.9 | 100 | 2.5 | | 80 | 20 | |
| Ex. 16 | 50 | 50 | | | 20 | 20 | | *25 200 | 0.9 | 100 | 2.5 | | 80 | 20 | |
| Comp. Ex. 2 | 50 | 50 | | 20 | | 20 | | *25 200 | 0.9 | 100 | 2.5 | | 15 | 85 | |
| Comp. Ex. 3 | 50 | 50 | | 20 | | 20 | | *25 200 | 0.9 | 100 | 0.2 | | 80 | 20 | |
| Comp. Ex. 4 | 50 | 50 | | 20 | | 20 | | *25 200 | 0.9 | 100 | 5 | | 80 | 20 | |
| Comp. Ex. 5 | 50 | 50 | | 20 | | 20 | | *25 200 | 0.9 | 100 | 2.5 | | 100 | 0 | |
| Comp. Ex. 6 | 50 | 50 | | 35 | | 35 | | *25 200 | 0.9 | 100 | 2.5 | | 30 | 70 | |

*1: Layer (A) containing alkaline compound of polyvalent metal,
*2: Non-aqueous main resin,
*3: Vylon 600 (wt %),
*4: Vylon GK570 (wt %),
*5: Vylon 550 (wt %),
*6: Isocyanate curing agent,
*7: Aliphatic,
*8: Sumidur N3300 (HDI-nulate) (wt %),
*9: Sumidur HT (HDI adduct) (wt %),
*10: Alicyclic,
*11: Desmodur Z4470 (IPDI-nulate) (wt %),
*12: Takenate D110N (XDI adduct) (wt %),
*13: Alkaline compound of polyvalent metal,
*14: Kind, amount (PHR),
*15: Equivalent (eq),
*16: Precursor layer (B),
*17: Polyacrylic acid,
*18: AC-10LP,
*19: Monovalent metal element,
*20: Neutralization ratio by Na hydroxide (%),
*21: Neutralization ratio by potassium (%),
*22: Solvent composition (weight ratio),
*23: Water,
*24: Acetone,
*25: Ca carbonate,
*26: Mg carbonate,
*27: Ca hydroxide,
*28: no metal element is contained in the resin skeleton Table 2 shows the measured results of the ionic cross-linking ratios of the gas barrier materials and gas barrier laminates obtained in the above Examples and Comparative Examples, contents of the monovalent metal element and polyvalent metal element found by using the ICP emission spectroanalyzer, contents of nitrogen per the total amount of nitrogen and carbon found by using an organic element analyzer, contents of nitrogen per the total amount of carbon, oxygen and nitrogen found from the analysis of compositions by the XPS in the surface of layer (B), layer (A) and region (a), appearance, waterproof property of the laminates after the bend working, and amounts of oxygen permeation before and after the retort treatment.

Examples provided good results in any aspect of evaluation. However, appearance became poor when the amount of the monovalent metal element was small, the waterproof property after the bend working and the gas barrier property after the retort treatment were poor when the content of the monovalent metal element was too large, the gas barrier property and waterproof property after the bend working were poor when the amount of the polyvalent metal element was small, the waterproof property after the bend working was poor when the content of nitrogen per the total amount of nitrogen and carbon was small as found by using the organic element analyzer, and the gas barrier property was poor when the content of nitrogen per the total amount of nitrogen and carbon was too large as found by using the organic element analyzer.

TABLE 3

| | *1 | | | *5 | | | | | | *14 | | | |
|---|---|---|---|---|---|---|---|---|---|---|---|---|---|
| | | | | *6 | *7 | | | | | | | | |
| | *2 | *3 | *4 | *8 | *9 | *10 | *11 | *12 | *13 | *15 | *16 | *17 | Remarks |
| Ex. 1 | 15 | 0.68 | 0.11 | 1.6 | — | — | ◎ | ◎ | 63 | <0.05 | <0.05 | 8.1 | |
| Ex. 2 | 14.3 | 0.69 | 0.12 | 1.4 | — | — | ◎ | ◎ | 60 | <0.05 | <0.05 | 8.8 | |
| Ex. 3 | 10.1 | 0.99 | 0.11 | 1.4 | — | — | ◎ | ◎ | 58 | <0.05 | <0.05 | 7.5 | |
| Ex. 4 | 14.8 | 0.68 | 0.11 | 1.5 | — | — | ◎ | ◎ | 64 | <0.05 | <0.05 | 4.8 | |
| Ex. 5 | 13 | 0.7 | 0.14 | 1.3 | 5.9 | 3.1 | ◎ | ◎ | 54 | <0.05 | <0.05 | 2.3 | *18 |
| Ex. 6 | 5.5 | 0.76 | 1.7 | 12 | 5.1 | 3.2 | ◎ | ◎ | 20 | <0.05 | 0.2 | 9.1 | |
| Ex. 7 | 13.1 | 0.11 | 0.15 | 1.4 | 5.6 | 3.3 | ◎ | ◎ | 54 | <0.05 | <0.05 | 2.6 | |
| Ex. 8 | 13.6 | 1.2 | 0.12 | 1.3 | 5.7 | 3.2 | ◎ | ◎ | 58 | <0.05 | <0.05 | 3.2 | |
| Ex. 9 | 14.1 | 0.72 | 0.04 | 1.1 | 5.9 | 3.4 | ◎ | ◎ | 59 | <0.05 | <0.05 | 3.3 | |
| Ex. 10 | 7.8 | 0.73 | 2.7 | 11.9 | 6.3 | 3.8 | ◎ | ◎ | 32 | <0.05 | 0.13 | 6.1 | |
| Ex. 11 | 13.5 | 1.2 | 0.19 | 1.3 | 5.8 | 3 | ◎ | ◎ | 57 | <0.05 | <0.05 | 3.4 | |
| Ex. 12 | 8.8 | 0.71 | 0.11 | 1.2 | 5.6 | 3.3 | ◎ | ◎ | 56 | <0.05 | <0.05 | 4.4 | |
| Ex. 13 | 13.1 | 0.7 | 0.21 | 1.1 | 5.6 | 3.3 | ◎ | ◎ | 54 | <0.05 | <0.05 | 4.5 | |
| Ex. 14 | 13.1 | 0.73 | 0.21 | 1.4 | 5.8 | 3.2 | ◎ | ◎ | 53 | <0.05 | <0.05 | 8.6 | *19 |
| Ex. 15 | 10.3 | 0.71 | 0.07 | 1.4 | 4.6 | 3 | ◎ | ◎ | 54 | <0.05 | <0.05 | 3.8 | |
| Ex. 16 | 14.4 | 0.69 | 0.21 | 1.3 | 4.4 | 2.9 | ◎ | ◎ | 53 | <0.05 | <0.05 | 3.6 | |
| Comp Ex. 1 | 13.5 | 0.66 | 4.4 | 13 | — | — | ◎ | ◎ | 57 | 0.85 | 0.81 | 11.1 | |
| Comp Ex. 2 | 4.3 | 0.69 | 2.5 | 12.5 | 5.2 | 3.1 | ◎ | X | 16 | 0.80 | 1.88 | 16.8 | |
| Comp Ex. 3 | 13.6 | <0.05 | 0.16 | 1.3 | 5.6 | 3.3 | X | ◎ | 54 | <0.05 | <0.05 | 2.2 | |
| Comp Ex. 4 | 12.3 | 1.52 | 0.18 | 1.2 | 5.5 | 3.2 | ◎ | X | 58 | <0.05 | 1.05 | 12.8 | |
| Comp Ex. 5 | 13.8 | 0.55 | <0.01 | <1.0 | 5.8 | 3.4 | ◎ | X | 57 | <0.05 | <0.05 | 2.9 | |
| Comp Ex. 6 | 8.9 | 0.58 | 3.3 | 12.7 | 5.1 | 3.1 | ◎ | ◎ | 35 | 1.13 | 1.52 | 15.0 | |

*1: Contents of elements in gas barrier material,
*2: Polyvalent metal (wt %),
*3: Monovalent metal (wt %),
*4: Amount of N per total of N and C (wt %),
*5: N content by XPS,
*6: Layer (B),
*7: Layer (A),
*8: Surface (atom %),
*9: Region (a) (atom %),
*10: Other than region (a) (atom %),
*11: Appearance (luster),
*12: Waterproofness after bending,
*13: Ionic crosslinking ratio %,
*14: Amount of O permeation ($cm^3/m^2 \cdot day \cdot atm$),
*15: O permeation before retort,
*16: O permeation after retort,
*17: O permeation after retort and 200 times of crushing,
*18: with AC layer,
*19: no metal is contained in the resin skeleton

INDUSTRIAL APPLICABILITY

The gas barrier material and the gas barrier laminate of the present invention have excellent gas barrier property, flexibility, retort resistance that enables excellent barrier property to be achieved even after placed under high-temperature and high-humidity conditions such as retort sterilization, as well as excellent transparency and luster on the surface of coating enabling favorable appearance to be exhibited and, further, excel in waterproof property after the bend working.

The gas barrier laminate of the invention comprises a combination of the gas barrier material, a plastic base material and an undercoating, is free from the occurrence of interlayer peeling, has improved ratio of crosslinking with polyvalent metal ions, and can be efficiently produced featuring favorable gas barrier property.

Therefore, the gas barrier laminate can be favorably used as a packing material in a field where retort sterilization is essential, and can be produced in quantity for containing foods and beverages that require shelf life.

DESCRIPTION OF REFERENCE NUMERALS 1 gas barrier layer (B)
2 layer (A) containing isocyanate compound
3 plastic base material
4 region (a) free of alkaline compound of polyvalent metal
5 urethane adhesive
6 biaxially stretched nylon film
7 unstretched polypropylene film

The invention claimed is:
1. A gas barrier laminate having:
   a gas barrier layer (B) formed on at least one surface of a plastic base material, the gas barrier layer (B) comprising a polycarboxylic acid polymer, and containing 0.10 to 1.4% by weight of a monovalent metal element, at least not less than 5.0% by weight of a polyvalent metal element, and 0.01 to 3.0% by weight of a nitrogen element per the total weight of nitrogen and carbon, and a layer (A) that contains an isocyanate compound having at least two isocyanate groups in a molecule thereof, the layer (A) being formed between the plastic base material and the gas barrier layer (B); wherein a region (a) free of the alkaline compound of a polyvalent metal is formed in the layer (A) on the side of the gas barrier layer (B), and the content of nitrogen in the region (a) is larger than the content of nitrogen in the layer (A) other than the region (a).

2. The gas barrier laminate according to claim 1, wherein said polycarboxylic acid polymer is a poly(meth)acrylic acid.

3. The gas barrier laminate according to claim 1, wherein said monovalent metal element is sodium or potassium.

4. The gas barrier material laminate according to claim 1, wherein said polyvalent metal element is calcium or magnesium.

5. The gas barrier laminate according to claim 1, wherein the content of nitrogen per the total amount of carbon, oxygen and nitrogen in the surface layer is not less than 1 atom %.

6. The gas barrier laminate according to claim 1, wherein said layer (A) contains an alkaline compound of a polyvalent metal.

7. The gas barrier laminate according to claim 1, wherein said alkaline compound of a polyvalent metal comprises at least one of a carbonate of calcium or magnesium, or a hydroxide thereof.

8. The gas barrier laminate according to claim 1, wherein said isocyanate compound is a combination of a straight-chain aliphatic isocyanate compound and an alicyclic isocyanate compound having an alicyclic ring structure in the skeleton thereof.

9. The gas barrier laminate according to claim 8, wherein said aliphatic isocyanate compound has an isocyanurate structure.

* * * * *